United States Patent
Kim et al.

(10) Patent No.: US 9,291,850 B2
(45) Date of Patent: Mar. 22, 2016

(54) POLARIZING PLATE AND LIQUID CRYSTAL DISPLAY APPARATUS INCLUDING THE SAME

(71) Applicant: CHEIL INDUSTRIES INC., Gumi-si, Gyeongsangbuk-do (KR)

(72) Inventors: Ae Kyoung Kim, Uiwang-si (KR); Han Saem Kang, Uiwang-si (KR); Han Su Kim, Uiwang-si (KR); Dong Yoon Shin, Uiwang-si (KR); A Ra Jo, Uiwang-si (KR); Hae Ryong Chung, Uiwang-si (KR)

(73) Assignee: CHEIL INDUSTRIES INC., Gumi-si (KR)

( * ) Notice: Subject to any disclaimer, the term of this patent is extended or adjusted under 35 U.S.C. 154(b) by 0 days.

(21) Appl. No.: 14/108,179

(22) Filed: Dec. 16, 2013

(65) Prior Publication Data

US 2014/0168579 A1  Jun. 19, 2014

(30) Foreign Application Priority Data

Dec. 17, 2012 (KR) .................. 10-2012-0147859

(51) Int. Cl.
  *G02B 5/30* (2006.01)
  *G02F 1/1335* (2006.01)
  *G02B 1/10* (2015.01)

(52) U.S. Cl.
  CPC ........ *G02F 1/133528* (2013.01); *G02B 5/3033* (2013.01); *G02B 5/3083* (2013.01); *G02B 1/105* (2013.01)

(58) Field of Classification Search
  CPC ............ G02B 1/10; G02B 1/105; G02B 5/30; G02B 5/3025–5/3058; G02B 5/3083; G02B 5/32; G02F 1/133528; G02F 1/13362; G02F 1/13363; G02F 2201/133531; G02F 2001/133543–2001/133548; B32B 7/00–7/002
  USPC ............. 359/487.01–487.03, 487.06, 489.01, 359/489.07, 489.11–489.13; 349/96, 102, 349/117, 122
  See application file for complete search history.

(56) References Cited

U.S. PATENT DOCUMENTS 4,592,623 A * 6/1986 Yamamoto et al. ...... 359/487.02
5,485,295 A * 1/1996 Itoh et al. ...................... 349/117

(Continued)

FOREIGN PATENT DOCUMENTS

CN  102124401 A  7/2011
KR  10-2009-0096405 A  9/2009

(Continued)

OTHER PUBLICATIONS

Murakami et al., WO 2012077663, Jun. 14, 2012, https://patentscope.wipo.int, English machine translation created Oct. 19, 2015.*

(Continued)

*Primary Examiner* — Stephone B Allen
*Assistant Examiner* — Adam W Booher
(74) *Attorney, Agent, or Firm* — Lewis Roca Rothgerber Christie LLP

(57) ABSTRACT

A polarizing plate includes a polarizer, a retardation film on a first side (e.g., a lower side) of the polarizer, and a protective film on a second side (e.g., an upper side) of the polarizer. The retardation film has an axis distortion angle between a fast axis of the retardation film and an absorption axis of the polarizer of about +0.03° to less than +0.2°. The protective film has an in-plane phase difference (Ro) of greater than about 10,000 nm and about 15,000 nm or less at a wavelength of 550 nm. A liquid crystal display apparatus includes the polarizing plate.

8 Claims, 2 Drawing Sheets

(56) References Cited

U.S. PATENT DOCUMENTS

| | | | |
|---|---|---|---|
| 6,057,961 A * | 5/2000 | Allen et al. | 359/489.12 |
| 6,542,300 B2 * | 4/2003 | Umemoto | 359/487.02 |
| 2002/0075564 A1 | 6/2002 | Umemoto | |
| 2011/0170041 A1 * | 7/2011 | Sakai | 349/96 |
| 2013/0162930 A1 * | 6/2013 | Shin et al. | 349/62 |

FOREIGN PATENT DOCUMENTS

| | | | | |
|---|---|---|---|---|
| KR | 10-2011-0074208 A | 6/2011 | | |
| TW | 571118 B | 1/2004 | | |
| TW | 571180 B | 1/2004 | | |
| WO | WO2012077663 | * | 6/2012 | G02B 5/30 |

OTHER PUBLICATIONS

SIPO Office action dated Jul. 27, 2015, issued in corresponding CN Application No. 201310693654.2, with English translation, 16 pages.

Taiwanese Patent Office action dated May 11, 2015, in corresponding TW Application No. 102146378, with English translation, 3 pages.

Korean Office action for Patent Application No. 10-2012-0147859, dated Jan. 19, 2015, 4 pages.

* cited by examiner

POLARIZING PLATE AND LIQUID CRYSTAL DISPLAY APPARATUS INCLUDING THE SAME

CROSS-REFERENCE TO RELATED APPLICATION

This application claims priority to and the benefit of Korean Patent Application No. 10-2012-0147859, filed on Dec. 17, 2012 in the Korean Intellectual Property Office, the entire content of which is incorporated herein by reference.

BACKGROUND

1. Technical Field

The present invention relates to a polarizing plate and a liquid crystal display apparatus including the same.

2. Description of the Related Art

Polarizing plates are used to control the oscillation direction of light in order to visualize the display patterns of a liquid crystal display apparatus inside and outside a liquid crystal cell. Although liquid crystal display apparatuses were initially applied to small apparatuses, recently, liquid crystal display apparatuses are used in a wide variety of applications, including notebook computers, liquid crystal monitors, liquid crystal color projectors, liquid crystal televisions, navigation systems for vehicles, personal phones, measurement instruments for use indoors and outdoors, and the like. Liquid crystal monitors and liquid crystal televisions generally employ a high-brightness backlight unit. Thus, a polarizing film of a polarizing plate is typically used to exhibit better performance.

The polarizing plate typically includes a polarizer, a protective film on one side of the polarizer, and a retardation film for imparting a phase difference on the other side of the polarizer. In the polarizing plate, when the polarizer and the retardation film are laminated, axis distortion between the absorption axis of the polarizer and the fast axis of the retardation film should be prevented in order to maximize polarization efficiency and allow the liquid crystal display apparatus to exhibit maximized contrast ratio. However, when the protective film and the retardation film have an ultrahigh phase difference, the polarizing plate can exhibit reduced polarization efficiency, and thus the liquid crystal display apparatus can exhibit deteriorated contrast ratio.

Polarization efficiency and contrast ratio are important factors in the evaluation of a liquid crystal display panel. Although modifications in the process conditions (such as elongation, the material for the polarizing plate, and the like) have been attempted to improve these characteristics, only limited benefits have been realized.

SUMMARY

In accordance with an embodiment of the present invention, a polarizing plate may include: a polarizer; a retardation film on a first side (e.g., a lower side) of the polarizer; and a protective film on a second side (e.g., an upper side) of the polarizer. The retardation film is disposed such that an angle between the fast axis of the retardation film and the absorption axis of the polarizer is about +0.03° to less than +0.2°. The protective film has an in-plane phase difference (Ro) of greater than about 10,000 nm to about 15,000 nm or less at a wavelength of 550 nm.

In accordance with another embodiment of the present invention, a liquid crystal display apparatus may include the polarizing plate.

BRIEF DESCRIPTION OF THE DRAWINGS

The above and other aspects, features and advantages of embodiments of the invention will be better understood by reference to the following detailed description when considered in conjunction with the accompanying drawings, in which.

DETAILED DESCRIPTION

Figure 1:
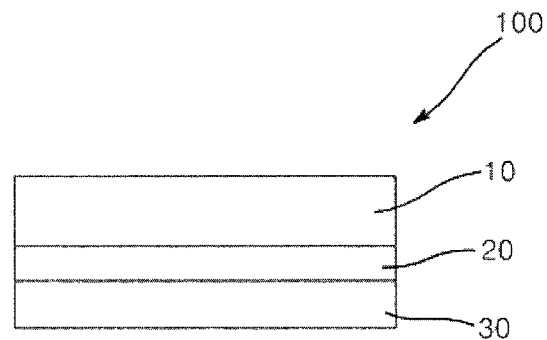
FIG. 1 is a cross-sectional view of a polarizing plate according to an embodiment of the present invention.

Embodiments of the present invention will be described with reference to the accompanying drawings. It should be understood, however, that the present invention may be modified in different ways and is not limited to the described embodiments. In the drawings, portions unnecessary to an understanding of the invention are omitted for clarity. Like components are denoted by like reference numerals throughout the specification.

As used herein, terms such as "upper side" and "lower side" are defined with reference to the accompanying drawings. It will be understood, however, that the term "upper side" can be used interchangeably with the term "lower side". As used herein, for indicating axis distortion, "+" refers to the clockwise direction with respect to a reference axis, and "−" refers to the counterclockwise direction with respect to the reference axis. The reference axis is the absorption axis of the polarizer.

Hereinafter, a polarizing plate according to one embodiment of the invention will be described in detail with reference to FIG. 1. FIG. 1 is a sectional view of a polarizing plate according to one embodiment of the present invention.

Referring to FIG. 1, a polarizing plate 100 according to an embodiment may include: a polarizer 20; a protective film 10 on a second side (e.g., an upper side) of the polarizer 20; and a retardation film 30 on a first side (e.g., a lower side) of the polarizer 20. The retardation film 30 may have an axis distortion (P-r) of the fast axis of the retardation film with respect to the absorption film of the polarizer of about +0.03° to less than +0.2°. The protective film 10 may have an in-plane phase difference (Ro) of about 5,000 nm to about 15,000 nm at a wavelength of 550 nm.

When the retardation film has an axis distortion of the fast axis of the retardation film with respect to the absorption axis of the polarizer of less than +0.03° or +0.2° or greater, the polarizing plate can exhibit poor polarization efficiency, and a liquid crystal display panel including the polarizing plate may exhibit a poor contrast ratio. In some exemplary embodiments, the retardation film may have an axis distortion of the fast axis of the retardation film with respect to the absorption axis of the polarizer of about +0.03° to about +0.15°, for example about +0.04° to about +0.15°. For example, the retardation film may have an axis distortion of the fast axis of the retardation film with respect to the absorption axis of the polarizer of +0.03°, +0.04°, +0.05°, +0.06°, +0.07°, +0.08°, +0.09°, +0.10°, +0.11°, +0.12°, +0.13°, +0.14° or +0.15°.

When the retardation film and the polarizer are laminated, axis distortion between the retardation film and the polarizer should be substantially prevented in order to allow the polarizing plate to exhibit maximum polarization efficiency and to allow a liquid crystal display apparatus including the polarizing plate to exhibit maximum contrast ratio. According to embodiments of the invention, the polarizing plate may exhibit improved polarization efficiency, and the liquid crystal display apparatus may exhibit improved contrast ratio by controlling such axis distortion.

Figure 2:
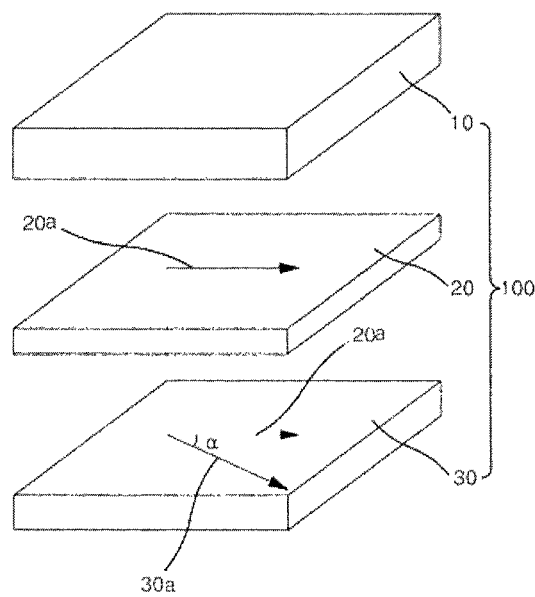
FIG. 2 is an exploded out perspective view of the polarizing plate of FIG. 1.

FIG. 2 is an exploded out perspective view of the polarizing plate depicted in FIG. 1. Referring to FIG. 2, the polarizing plate 100 may include: the polarizer 20; the protective film 10 on the second side (e.g., the upper side) of the polarizer 20; and the retardation film 30 on the first side (e.g., the lower side) of the polarizer 20. The retardation film 30 may have an axis distortion (α) of the fast axis 30a of the retardation film with respect to the absorption axis 20a of the polarizer 20. In some embodiments, α may be about +0.03° to less than about +0.2°.

The protective film 10 is a film elongated at a high magnification and has an ultrahigh phase difference. For example, the protective film may have an in-plane phase difference (Ro) of about 5,000 nm to about 15,000 nm at a wavelength of 550 nm. If the Ro is less than 5,000 nm or greater than 15,000 nm, the polarizing plate can suffer from reduced polarization efficiency, rainbow spots and lateral light leakage, and can have a difference in the phase difference depending on the angle or wavelength of incident light. For example, the protective film may have an Ro of greater than about 10,000 nm, for example about 10,100 nm to about 12,000 nm, or about 12,000 nm to about 15,000 nm. In some embodiments, for example, the protective film may have an Ro of about 12,000 nm to about 13,000 nm at a wavelength of 550 nm, for example about 10,100, 10,200, 10,300, 10,400, 10,500, 10,600, 10,700, 10,800, 10,900, 11,000, 11,100, 11,200, 11,300, 11,400, 11,500, 11,600, 11,700, 11,800, 11,900, 12,000, 12,100, 12,200, 12,300, 12,400, 12,500, 12,600, 12,700, 12,800, 12,900, 13,000, 13,100, 13,200, 13,400, 13,500, 13,600, 13,700, 13,800, 13,900, 14,000, 14,100, 14,200, 14,300, 14,500, 14,600, 14,700, 14,800, 14,900 or 15,000 nm.

The protective film 10 may have a degree of biaxiality (Nz) of about 1.8 or less at a wavelength of 550 nm. In some embodiments, for example, the protective film may have a degree of biaxiality (Nz) of about 1.0 to about 1.8, for example, about 1.0, 1.1, 1.2, 1.3, 1.4, 1.5, 1.6, 1.7 or 1.8. The degree of biaxiality (Nz) is calculated according to Equation 1. Within any of the above ranges, the protective film can suppress rainbow spots due to birefringence.

$$Nz=(nx-nz)/(nx-ny) \quad \text{Equation 1}$$

In Equation 1, nx, ny and nz are the refractive indices in the x-, y- and z-axis directions (respectively) of the protective film at a wavelength of 550 nm.

The protective film may have an out-of-plane retardation (Rth) of about 15,000 nm or less at a wavelength of 550 nm. In some embodiments, for example, the protective film may have an out-of-plane retardation (Rth) of about 10,000 nm to about 12,000 nm, for example, about 10,000, 10,200, 10,400, 10,600, 10,800, 11,000, 11,200, 11,400, 11,600, 11,800, or 12,000 nm. The out-of-plan retardation (Rth) is calculated according to Equation 2. Within any of the above ranges, the protective film can suppress rainbow spots due to birefringence.

$$Rth=((nx+ny)/2-nz) \times d \quad \text{Equation 2}$$

In Equation 2, nx, ny and nz are the refractive indices in the x-, y- and z-axis directions (respectively) of the protective film at a wavelength of 550 nm, and d is the thickness of the protective film (in nm).

The x-axis direction of the protective film 10 may be the longitudinal direction thereof (MD), the y-axis direction may be the width direction thereof (TD), and the z-axis direction may be the thickness direction thereof. The x-axis, y-axis and z-axis are orthogonal to each other.

The protective film may have a value of nx-ny of about 0.1 to 0.2, for example about 0.1, 0.11, 0.12, 0.13, 0.14, 0.15, 0.16, 0.17, 0.18, 0.19 or 0.2. Within any of these ranges, the protective film can suppress rainbow spots due to birefringence.

The polarizing plate according to embodiments of the present invention may be stacked on a liquid crystal display panel (not shown) via an adhesive layer. The liquid crystal display panel may include a Twisted Nematic (TN) liquid crystal display panel, a Super Twisted Nematic (STN) liquid crystal display panel, a horizontal alignment mode liquid crystal display panel (such as a Super In-plane Switching (Super-IPS) display panel, a Fringe Field Switching (FFS) display panel, or the like), or a vertical alignment (VA) mode liquid crystal display panel. In some embodiments, the polarizing plate is stacked on a vertical alignment (VA) mode liquid crystal display panel.

The adhesive included in the adhesive layer may be any adhesive suitable as an adhesive for optical films, without limitation. The adhesive should be capable of exhibiting transparency, durability, reworkability and the like. For example, the adhesive may include a (meth)acrylic copolymer as an adhesive resin. As used herein, the term "(meth) acrylic copolymer" refers to acrylic copolymers, methacrylic copolymers, and acrylic-methacrylic copolymers.

The polarizing plate may have a thickness of about 100 μm to about 200 μm. Within this range, the polarizing plate can be more easily applied to the liquid crystal display apparatus.

The polarizer may include a polyvinyl alcohol resin. The polarizer may be a linear polarizer, and may be formed by adsorption and alignment of a dichroic material to a polyvinyl alcohol resin to absorb linearly polarized light having an oscillation plane of a specific direction, and the polarizer may transmit linearly polarized light having an oscillation plane of a direction orthogonal thereto. The dichroic material may be iodine or a dichroic organic dye.

The polarizer may be formed by uniaxial elongation of a polyvinyl alcohol resin film, followed by dyeing the polyvinyl alcohol resin film with a dichroic material, and a boric acid treatment.

The polarizer may have a thickness of about 10 μm to about 50 μm.

The polarizer may be stacked on the protective film via a bonding layer. The bonding layer may be formed of a bonding agent for polarizing plates, for example, a water-based bonding agent or a pressure-sensitive bonding agent. The bonding layer may have a thickness of about 50 nm to about 200 nm.

The protective film is a transparent protective layer and protects the polarizer. The protective film may include an acetyl cellulose resin film including triacetyl cellulose or diacetyl cellulose. In some embodiments, the protective film includes a polyester film including a polyethylene terephthalate or polyethylene naphthalate resin film. When polyethylene terephthalate or polyethylene naphthalate is used as the protective film, a thinner and highly durable liquid crystal panel can be prepared which can be used for vehicles (due to its high durability).

Although not shown in FIG. 1, the protective film may further include a surface coating layer. In some embodiments, the surface coating layer may be formed between the polarizer and the protective film.

The protective film generally has a hydrophobic surface. For example, when a polyethylene terephthalate film is used as the protective film, the protective film may exhibit higher hydrophobicity. To apply the polyethylene terephthalate film to the polarizing plate, the polyethylene terephthalate film is surface modified to convert the surface thereof from a hydrophobic surface to a hydrophilic surface. Existing surface modification technology for cellulose films uses sodium hydroxide. However, this leads to insufficient modification or film damage. According to embodiments of the present invention, however, a surface coating layer may be formed on the protective film that includes a primer having hydrophobic and hydrophilic functional groups. Nonlimiting examples of primers having hydrophobic and hydrophilic functional groups include polyester resins, polyvinyl acetate resins, and mixtures thereof.

The mechanical properties and low water permeability of the protective film are improved by addition of the surface coating layer, thereby imparting high resistance of the polarizing plate to severe external conditions. In addition, the surface coating layer is formed between the protective film and the polarizing plate, thereby improving adhesion between the protective film and the polarizer.

The protective film may be an elongated film subjected to uniaxial or biaxial elongation in the MD or TD direction. In some embodiments, for example, the protective film may have an elongation ratio of about 1 to about 6.

The protective film may have a haze value of about 0.001% to about 10%, for example, about 0.1% to about 5%. Within either of these ranges, the protective film can be more easily applied to the polarizing plate.

The protective film may have a total light transmittance of about 50% to about 99%, for example, about 85% to about 99%. Within either of these ranges, the protective film can be more easily applied to the polarizing plate.

The protective film may have a thickness of about 25 μm to about 500 μm. Within this range, the protective film can be more easily handled, provide a thinner display panel, and be more easily applied to the polarizing plate. In some embodiments, the protective film has a thickness of about 25 μm to about 300 μm, for example, about 25 μm to about 150 μm.

The protective film may be subjected to surface treatment on the surface opposite to the polarizer-bonded surface. The surface treatment may include an anti-glare (AG) treatment, a hard coating treatment, an anti-static treatment, and anti-reflection (AR) treatment, or the like.

In addition, the protective film may further include a coating layer on the surface subjected to the surface treatment. The coating layer may include liquid crystal compounds, polymeric compounds thereof, or the like.

For further surface protection, the protective film may further include a surface protective film stacked on the surface subjected to the surface treatment.

The retardation film has a retardation function and serves to cancel or add retardation generated by a liquid crystal cell. Retardation films are generally classified into uniaxial retardation films (i.e., those having one optical axis) and biaxial retardation films (i.e., those having two optical axes) based on the number of optical axes. In addition, the retardation film has a positive or negative birefringence based on the refractive index in the optical axis direction and another direction. That is, if the retardation film has a higher refractive index in the optical axis direction than in the other direction, the retardation film has a positive birefringence. Conversely, if the retardation film has a lower refractive index in the optical axis direction than in the other direction, the retardation film has a negative birefringence.

Retardation includes in-plane retardation (Re) and out-of-plane retardation (Rth). Re and Rth can be calculated using Equations 3 and 4, respectively.

$$Re = (n_x - n_y) \times d \quad \text{Equation 3}$$

$$Rth = ((n_x + n_y)/2 - n_z) \times d \quad \text{Equation 4}$$

In Equations 3 and 4, $n_x$, $n_y$ and $n_z$ are the refractive indices in the x-, y- and z-axis directions (respectively) of the retardation film (respectively) at a wavelength of 550 nm, and d is the thickness of the retardation film (in nm).

In relation to retardation, Nz (indicating a degree of biaxiality) can be calculated using Equation 5.

$$Nz = (n_x - n_z)/(n_x - n_y) \quad \text{Equation 5}$$

In Equation 5, $n_x$, $n_y$ and $n_z$ are the refractive indices in the x-, y- and z-axis directions (respectively) of the retardation film at a wavelength of 550 nm.

Figure 3:
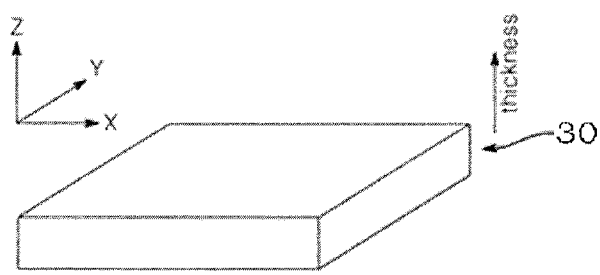
FIG. 3 is a perspective view of a retardation film according to an embodiment of the present invention.

FIG. 3 is a perspective view of a retardation film of a polarizing plate according to an embodiment of the present invention. Referring to FIG. 3, the x-axis direction of the retardation film 30 is the longitudinal direction thereof (i.e., the MD direction), the y-axis direction is the width direction thereof (i.e., the TD direction), and the z-axis direction is the thickness direction thereof. The x-axis, y-axis and z-axis directions are orthogonal to each other.

In some embodiments, the retardation film may be a positive biaxial film, and have an Re of about 0 nm to about 80 nm, for example, about 0, 10, 20, 30, 40, 50, 60, 70, or 80 nm. The retardation film may also have an Rth of about 0 nm to about 200 nm, for example, about 0, 10, 20, 30, 40, 50, 60, 70, 80, 90, 100, 110, 120, 130, 140, 150, 160, 170, 180, 190 or 200 nm. Also, the retardation film may have an Nz at a wavelength of 550 nm of about 1 to about 5, for example, about 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0. Within any of these ranges, when included in the polarizing plate, the retardation film can improve polarization efficiency, and a liquid crystal display panel including the polarizing plate can exhibit improved front and lateral contrast ratios.

For example, the retardation film may have an Re of 0 nm to 40 nm, or 0 nm to 30 nm, and may have an Rth of 0 nm to 50 nm, or 0 nm to 40 nm at a wavelength of 550 nm. Within any of these ranges, the retardation film may exhibit a low phase difference, thereby allowing the manufacture of a larger display apparatus while maintaining a good viewing angle.

The retardation film may include a cellulose film (such as a triacetyl cellulose (TAC) film, a cellulose acetate propionate (CAP) film, or the like), a cycloolefin polymer (COP) film, a polynorbornene film, a polycarbonate film, a polyester film, a polyether sulfone film, a polysulfone film, a polyamide film, a polyimide film, a polyolefin film, a polyacrylate film, a polyvinyl alcohol film, a polyvinyl chloride film, a polyvinylidene chloride resin film, or a mixture thereof. In some embodiments, the retardation film may be a cellulose or cycloolefin polymer (COP) film, for example, a triacetyl cellulose retardation film (also referred to as an N-TAC film) or the like.

The retardation film may have a thickness of about 10 μm to about 100 μm. Within this range, when used in the polarizing plate, the retardation film can effect optical compensation and substantially prevent color change and rainbow spots, and the polarizing plate can exhibit a good polarization state for liquid crystals. In some embodiments, for example, the retardation film has a thickness of about 30 μm to about 90 μm.

When the retardation film (and particularly the retardation film formed of a cellulose resin) is bonded to the polarizer, the polarization efficiency and contrast ratio of the resulting liquid crystal display panel should be considered in determining the disposition of the axes of the retardation film and the polarizer. In some embodiments, when the retardation film and the polarizer are laminated, the retardation film may be disposed such that the axis distortion of the fast axis of the retardation film with respect to the absorption axis of the polarizer is about +0.03° to less than +0.2°. If the retardation film has an axis distortion of the fast axis of the retardation film with respect to the absorption axis of the polarizer of less than about +0.03° or about +0.2° or greater, the polarizing plate can exhibit poor polarization efficiency, and the resulting liquid crystal display panel including the polarizing plate can exhibit a poor contrast ratio.

The polarizer may be stacked on the retardation film via a bonding layer. The bonding layer may be formed of a bonding agent for polarizing plates, for example a water-based bonding agent or a pressure-sensitive bonding agent. The bonding layer may have a thickness of about 50 nm to about 200 nm.

Hereinafter, a liquid crystal display apparatus according to embodiments of the present invention will be described with reference to FIG. 4, which is a cross-sectional view of a liquid crystal display apparatus according to an embodiment of the present invention.

Figure 4:
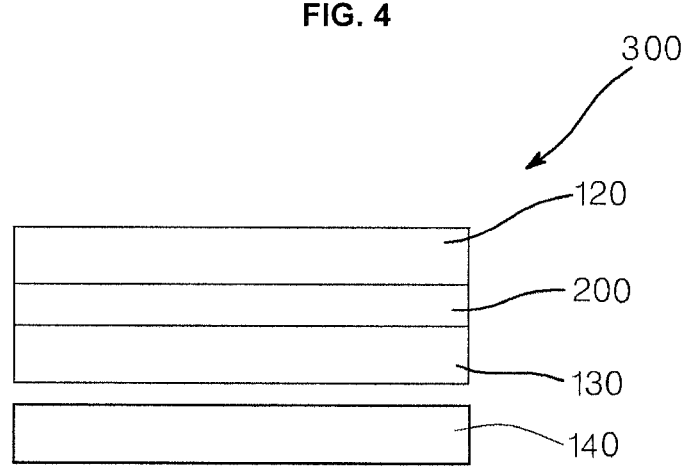
FIG. 4 is a cross-sectional view of a liquid crystal display apparatus according to an embodiment of the present invention.

Referring to FIG. 4, a liquid crystal display 300 may include: a liquid crystal display panel 200; a first polarizing plate 120 on a second side (e.g., an upper side) of the display panel 200; a second polarizing plate 130 on a first side (e.g., a lower side) of the display panel 200; and a backlight unit 140 on the exposed side (e.g., the lower side) of the second polarizing plate 130. At least one of the first or second polarizing plates 120, 130 may be the polarizing plate described above.

Although not shown in FIG. 4, the liquid crystal display panel 200 may include: a first substrate; a second substrate facing the first substrate; and a liquid crystal layer between the first and second substrates. The liquid crystal layer may include liquid crystals arranged such that the liquid crystal display panel is a TN display panel, a STN display panel, a IPS display panel, a Super-IPS display panel, a FFS display panel, or a VA mode display panel.

Although not shown in FIG. 4, the backlight unit 140 may include a light source, a light guide plate, a reflective sheet, a diffusion sheet, and the like.

Embodiments of the present invention will now be described with reference to some examples. However, it should be noted that these examples are provided for illustration only and are not to be construed in any way as limiting the present invention.

The components used in the Examples and Comparative Examples are as follows:

(A) Polarizer: Polyvinyl alcohol film (VF-PS6000, Kuraray Co., Ltd., Japan; thickness: 60 μm)

(B) Protective film: Polyethylene terephthalate film (in-plane phase difference Ro at a wavelength of 550 nm: 12,000 nm; thickness: 100 μm; total transmittance: 42.7±0.2%)

(C) Retardation film: Triacetyl cellulose film (N-TAC, Konica Co., Ltd., Japan; thickness: 40 μm)

EXAMPLES AND COMPARATIVE EXAMPLES

A polarizer was prepared by dyeing a polarizer material, followed by elongation, and the like. Specifically, after a polyvinyl alcohol film was elongated to a length of 3 times its initial length at 60° C., iodine was adsorbed onto the polyvinyl alcohol film, followed by elongation to a length of 2.5 times the length of the elongated film in a boric acid solution at 40° C., thereby preparing a polarizer.

A protective film was stacked on an upper side of the polarizer using a bonding agent (Z-200, Nippon Goshei Co., Ltd.). A retardation film was disposed on a lower side of the polarizer such that the axis distortion of the fast axis of the retardation film with respect the absorption axis of the polarizer was as listed in Table 1. The retardation film was bonded to the polarizer using the bonding agent (Z-200, Nippon Goshei Co., Ltd.).

The axis distortion between the fast axis of the retardation film and the absorption axis of the polarizer was measured using an Axoscan device, and the polarization efficiency of the polarizing plate was measured using a Jasco V7100 device.

The polarizing plate was sampled in the MD direction to yield 50 mm×50 mm specimens for measurement. After the specimen was positioned such that light was incident upon a surface of the retardation film, the polarization efficiency was measured using the Jasco V7100, and the axis distortion between the fast axis of the retardation film and the absorption axis of the polarizer was measured using the Axoscan. The difference in polarization efficiency was calculated based on the specimen of Comparative Example 1 (having no axis distortion) as a reference.

The prepared polarizing plate was attached to a 32-inch liquid crystal panel (LTA320AP02, VA mode, Samsung Electronics Co., Ltd.), and the contrast ratio was measured using a luminance meter (SR-3A, Topcon Co., Ltd.). The Contrast Ratio (CR) is a value measured when the polarizing plate is mounted on the liquid crystal panel, and the CRO is a calculated value based on the contrast ratio of the specimen of Comparative Example 1 as a reference. That is, the CRO is a percentage difference from the CR of the specimen of Comparative Example 1, and is calculated as follows:

CRO=[(measured CR−CR of Comp. Ex. 1)/(CR of Comp. Ex. 1)]×100.

TABLE 1

|  | Axis distortion (°) | Phase difference of protective film (Ro)(nm) | Polarization efficiency (%) | Difference in polarization efficiency (%) | CR | CRO (%) |
| --- | --- | --- | --- | --- | --- | --- |
| Example 1 | +0.05 | 12,000 | 99.9981 | +0.002 | 5400 | +1.3 |
| Example 2 | +0.1 | 12,000 | 99.9983 | +0.004 | 5491 | +3.0 |
| Example 3 | +0.15 | 12,000 | 99.9982 | +0.003 | 5475 | +2.7 |
| Comparative Example 1 | 0 | 12,000 | 99.9979 | — | 5329 | — |
| Comparative Example 2 | +0.3 | 12,000 | 99.9974 | −0.005 | 5199 | −2.4 |
| Comparative Example 3 | +0.2 | 12,000 | 99.9979 | 0 | 5319 | −0.2 |
| Comparative Example 4 | +0.01 | 12,000 | 99.9979 | 0 | 5338 | +0.2 |
| Comparative Example 5 | −0.05 | 12,000 | 99.9978 | −0.001 | 5300 | −0.5 |
| Comparative Example 6 | −0.1 | 12,000 | 99.9975 | −0.004 | 5210 | −2.2 |
| Comparative Example 7 | −0.15 | 12,000 | 99.9972 | −0.007 | 5001 | −6.2 |

As shown in Table 1, the polarizing plate according to embodiments of the invention exhibited high polarization efficiency, and the liquid crystal display panels including the polarizing plates exhibited high contrast ratios.

Conversely, the polarizing plates of Comparative Examples 2 to 7 (which had axis distortions between the absorption axis of the polarizer and the fast axis of the retardation film outside the range according to embodiments of the invention, or a phase difference of the protective film outside the range according to embodiments of the invention) exhibited poor polarization efficiency, and the liquid crystal display panels including the polarizing plates of Comparative Examples 2 to 7 exhibited undesirable contrast ratios.

While certain exemplary embodiments of the present invention have been illustrated and described, those of ordinary skill in the art will understand that various modifications may be made to the described embodiments without departing from the spirit and scope of the present invention, as defined in the attached claims.

What is claimed is:

1. A polarizing plate comprising:
    a polarizer;
    a retardation film on a first side of the polarizer; and
    a protective film on a second side of the polarizer,
    wherein an axis distortion angle between a fast axis of the retardation film and an absorption axis of the polarizer is about +0.05° to about +0.15°, and the protective film has an in-plane phase difference (Ro) of greater than about 10,000 nm to about 15,000 nm or less at a wavelength of 550 nm.

2. The polarizing plate according to claim 1, wherein the protective film is a polyethylene terephthalate film.

3. The polarizing plate according to claim 1, wherein the protective film is a surface-modified protective film.

4. The polarizing plate according to claim 1, wherein the retardation film has an in-plane retardation (Re) of about 0 nm to about 80 nm at a wavelength of 550 nm, wherein the in-plane retardation (Re) is represented by Equation 3:

$$Re = (nx - ny) \times d \qquad \text{Equation 3}$$

wherein nx is a refractive index at a wavelength of 550 nm in an x-axis direction of the retardation film, ny is a refractive index at a wavelength of 550 nm in a y-axis direction of the retardation film, and d is a thickness of the retardation film in nm.

5. The polarizing plate according to claim 1, wherein the retardation film has an out-of-plane retardation (Rth) of about 0 nm to about 200 nm at a wavelength of 550 nm, wherein the out-of-plane retardation (Rth) is represented by Equation 4:

$$Rth = ((nx + ny)/2 - nz) \times d \qquad \text{Equation 4}$$

wherein nx is a refractive index at a wavelength of 550 nm in an x-axis direction of the retardation film, ny is a refractive index at a wavelength of 550 nm in a y-axis direction of the retardation film, and nz is a refractive index at a wavelength of 550 nm in a z-axis direction of the retardation film, and d is a thickness of the retardation film in nm.

6. The polarizing plate according to claim 1, wherein the retardation film has a degree of biaxiality (Nz) of about 1 to about 5 at a wavelength of 550 nm, wherein the degree of biaxiality (Nz) is represented by Equation 5:

$$Nz = (nx - nz)/(nx - ny) \qquad \text{Equation 5}$$

wherein nx is a refractive index at a wavelength of 550 nm in an x-axis direction of the retardation film, ny is a refractive index at a wavelength of 550 nm in a y-axis direction of the retardation film, and nz is a refractive index at a wavelength of 550 nm in a z-axis direction of the retardation film.

7. The polarizing plate according to claim 1, wherein the retardation film comprises a material selected from the group consisting of celluloses, cycloolefin polymers (COPs), polynorbornene resins, polycarbonate resins, polyester resins, polyether sulfone resins, polysulfone resins, polyamide resins, polyimide resins, polyolefin resins, polyacrylate resins, polyvinyl alcohol resins, polyvinyl chloride resins, polyvinylidene chloride resins, and combinations thereof.

8. A liquid crystal display apparatus comprising the polarizing plate according to claim 1.

* * * * *